(12) United States Patent
Watson et al.

(10) Patent No.: US 7,444,327 B2
(45) Date of Patent: Oct. 28, 2008

(54) SYSTEM AND METHOD FOR AUTOMATED OPTIMIZATION OF SEARCH RESULT RELEVANCE

(75) Inventors: Eric B. Watson, Redmond, WA (US); Oliver Hurst-Hiller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 10/805,731

(22) Filed: Mar. 22, 2004

(65) Prior Publication Data
US 2005/0154716 A1    Jul. 14, 2005

Related U.S. Application Data

(60) Provisional application No. 60/535,353, filed on Jan. 9, 2004.

(51) Int. Cl.
G06F 7/00 (2006.01)
G06F 17/30 (2006.01)
G06F 17/00 (2006.01)

(52) U.S. Cl. .................................. 707/5; 707/101

(58) Field of Classification Search ............. 707/1, 707/2, 3, 5, 101
See application file for complete search history.

(56) References Cited

U.S. PATENT DOCUMENTS

| | | | | |
|---|---|---|---|---|
| 6,223,215 B1 * | 4/2001 | Hunt et al. | ............... | 709/217 |
| 6,269,361 B1 * | 7/2001 | Davis et al. | ............... | 707/3 |
| 6,326,962 B1 * | 12/2001 | Szabo | ............... | 715/762 |
| 6,360,227 B1 * | 3/2002 | Aggarwal et al. | ............... | 707/102 |
| 6,434,550 B1 * | 8/2002 | Warner et al. | ............... | 707/3 |
| 6,526,440 B1 * | 2/2003 | Bharat | ............... | 709/219 |
| 6,529,903 B2 * | 3/2003 | Smith et al. | ............... | 707/7 |
| 6,615,209 B1 | 9/2003 | Gomes et al. | | |
| 6,643,639 B2 * | 11/2003 | Biebesheimer et al. | ......... | 707/3 |
| 6,647,383 B1 * | 11/2003 | August et al. | ............... | 707/3 |
| 6,658,423 B1 | 12/2003 | Pugh et al. | | |
| 6,678,681 B1 | 1/2004 | Brin | | |
| 2002/0123988 A1 | 9/2002 | Dean et al. | | |

(Continued)

FOREIGN PATENT DOCUMENTS

EP    1 282 051 A1    2/2003

(Continued)

OTHER PUBLICATIONS

Tedeschi, B., "Measuring Online Ad Effectiveness," nytimes.com, Nov. 3, 2003, <http://www.nytimes.com/2003/11/03/technology/03E3com.HTML?PAGEWANTED=PRINT&POSITION=> [Retrieved Nov. 3, 2003].

(Continued)

*Primary Examiner*—Etienne P LeRoux
*Assistant Examiner*—Brent Stace
(74) *Attorney, Agent, or Firm*—Shook, Hardy & Bacon LLP

(57) ABSTRACT

A method, system, and computer-accessible medium are provided for automating the optimization of search result relevance in a search engine. The system and method continually collect data that represent various aspects of how a search result is performing and compare that performance data to the expected performance for the search result. The system and method further diagnose the possible causes of under performing results and automatically adjust the search engine operation to optimize the search result relevance.

66 Claims, 7 Drawing Sheets

U.S. PATENT DOCUMENTS

| | | |
|---|---|---|
| 2002/0133481 A1 | 9/2002 | Smith et al. |
| 2002/0152204 A1* | 10/2002 | Ortega et al. .................. 707/3 |
| 2003/0014331 A1 | 1/2003 | Simons |
| 2003/0033292 A1* | 2/2003 | Meisel et al. ................. 707/3 |
| 2003/0135490 A1 | 7/2003 | Barrett et al. |
| 2003/0172075 A1* | 9/2003 | Reisman ...................... 707/10 |
| 2005/0080771 A1* | 4/2005 | Fish .............................. 707/3 |

FOREIGN PATENT DOCUMENTS

| | | |
|---|---|---|
| WO | WO 99/41694 A1 | 8/1999 |
| WO | WO 01/82178 A2 | 11/2001 |
| WO | WO 02/27529 A | 4/2002 |
| WO | WO 02/063514 A | 8/2002 |

OTHER PUBLICATIONS

Walker, L., "Finding More Than You Bargained For," washingtonpost.com, Dec. 19, 2002, <http://nl.newsbank.com/nl-search/we/Archives?p_action=doc&p_docid=0F806C198A52...> [Retrieved Nov. 21, 2003].

Walker, L., "Search Engine Listing Up For Bid," SiliconValley.com, Mar. 6, 2002, <http://www.siliconvalley.com/mld/siliconvalley/business/technology/personal_technolog...> [Retrieved Nov. 21, 2003].

Walker, L., "We Get What They Pay For," washingtonpost.com, Feb. 28, 2002, <http://nl.newsbank.com/nl-search/we/Archives?p_action=doc&p_docid=0F1F861F927C...> [Retrieved Nov. 21, 2003].

Walker, L., "Web Giants Seek Fortune In Search Ads," washingtonpost.com, Jul. 17, 2003, <http://nl.newsbank.com/nl-search/we/Archives?p_action=doc&p_docid=0FC5A6F721EA...> [Retrieved Nov. 21, 2003].

* cited by examiner

SYSTEM AND METHOD FOR AUTOMATED OPTIMIZATION OF SEARCH RESULT RELEVANCE

CROSS-REFERENCE TO RELATED APPLICATION

This application claims the benefit of U.S. Provisional Application No. 60/535,353, filed Jan. 9, 2004, which is hereby claimed under 35 U.S.C. §119.

FIELD OF THE INVENTION

In general, the present invention relates to computer software and search engines and, in particular, to systems and methods for automating search result relevance optimization.

BACKGROUND OF THE INVENTION

The Internet search engine has become an important source of revenue for the service providers that operate them. The revenue is primarily generated from the display of advertisements to search engine users. The more Internet traffic that a search engine receives, the more attractive it is to advertisers and the more revenue it can generate. It is generally regarded that the best way search engines can increase traffic is to provide highly relevant search results. But what is relevant today may not be relevant tomorrow or even relevant later the same day. It is difficult for service providers to keep pace with the rapid changes in searchable content based on seasonal and popular trends and topical events in the news.

One way that search engine operators strive to maintain the relevance of the results that their search engines generate is to use a relevance schema. The relevance schema represents the algorithm the search engine uses to generate a set of search results, usually in a particular order of relevance. The relevance schema is continually reevaluated using human judges to determine whether the results produced using the schema are valid, i.e., whether the results are still relevant. The search engine operator makes changes to the schema from time to time, as indicated by the human judges.

The problem with the above approach to maintaining the relevance of the search engine is that it is time-consuming, slow, and subjective. The human judges can only evaluate just so many possible search results, and their judgments of what is or is not relevant may not reflect a typical user's judgment. Other approaches suffer from similar drawbacks. For example, some users may respond to surveys conducted by the search engine operator, giving direct feedback on the relevance of a particular set of search results. But the amount of data collected in this manner may be of insufficient volume to be considered reliable, and simply does not have the breadth and scale to truly reflect what users want when conducting their searches.

Another approach that is becoming more prevalent is the use of click-through data collected for the search results. The search engine operator collects the user's interaction with the search results by recording the number of times users click on a result, referred to as the "click-through rate" or CTR. The click-through data has a number of advantages in that data can be collected in large volume as users interact with search results and is therefore a more objective measure of user satisfaction and more reliable predictor of relevance. In general, experience has shown that the higher the CTR, the more relevant the result, or at least the greater the satisfaction of the user with the result. But the CTR data must still be analyzed and the operator must then decide how to update the relevance schema to generate better results. Moreover, the CTR data alone may be insufficient to produce a meaningful result. For example, the CTR of a particular result may be influenced by a number of factors related to the appearance of the result on the page that cause the CTR to be unduly inflated out of proportion to the actual relevance of the underlying result.

No matter what the approach, determining the relevance of search results is a difficult task, in large part because there is no single definitive indicator of success of a search result. The sheer scale of the number of queries handled by a search engine and the speed with which the search results are generated make relevance a fast-moving target.

SUMMARY OF THE INVENTION

To overcome the above-described problems, a system, method, and computer-accessible medium for automating the optimization of search result relevance in a search engine are provided. The system and method continually collect data that represent various aspects of how a search result is performing and compare that performance data to the expected performance for the search result. The system and method further diagnose the possible causes of under performing results and automatically adjust the search engine operation to optimize the search result relevance.

In accordance with one aspect of the present invention, the performance data is collected from one or more sources and preferably includes implicit data automatically collected when the user interacts with the search result, such as CTR data, but may also include explicit data collected when the user makes use of search engine help or support features, or responds to user satisfaction surveys, as well as subjective, human-judged data, relevance verification test data, and sample test data. The various sources of data may be normalized to reflect their relative importance or reliability as predictors of relevance.

In accordance with another aspect of the present invention, the expected performance data may be one or more value(s) that represents the expected performance for a result, such as an expected CTR, and can vary from one market to the next. A result may be determined to be under performing when its performance does not meet the expected performance, including performing below or substantially below the expected performance value.

In accordance with a further aspect of the present invention, diagnosing the possible causes of under performing results includes considering a number of factors, such as whether the result links to a Web site or document that is no longer valid, is appearing in a poor location, whether the search term that produced the result is easily misspelled or too broad to produce a meaningful result, or whether the search for a particular search term should be constrained to a particular resource, such as a local community resource.

In accordance with a still further aspect of the present invention, automatically adjusting the search engine operation to optimize the search result relevance includes taking a variety of actions on components of the search engine. For example, the search schema used by the search engine to produce the search results may be modified so that future search results may be reranked, removed, repositioned, or replaced with different results. In some cases, the search results may remain the same, but the presentation of the results may be augmented to increase visibility and improve performance. In still other cases, the under performing search may be temporarily modified to include new or augmented results and tested in a sample market before making the modification permanent. In cases where the search term is itself the problem, the spellchecker tolerance may be increased, or the presentation of the results may be modified to prompt the user to clarify or narrow the search with additional search terms. In some cases, the operation of the search engine may be adjusted in real time to rapidly optimize the relevance of the search results in response to sudden changes in search result performance.

In accordance with yet other aspects of the present invention, a computer-accessible medium for automating the optimization of search result relevance in a search engine is provided. The computer-accessible medium comprises data structures and computer-executable components comprising an automated relevance optimizer for collecting performance data, diagnosing under performing searches, and automatically adjusting the operation of the search engine to optimize the relevance of search results. The data structures define search result and performance data in a manner that is generally consistent with the above-described method. Likewise, the computer-executable components are capable of performing actions generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

The following discussion is intended to provide a brief, general description of a computing system suitable for implementing various features of an embodiment of the invention. While the computing system will be described in the general context of a personal and server computer or other types of computing devices usable in a distributed computing environment where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices including laptop computers, tablet computers, personal digital assistants (PDAs), cellular telephones, and other devices upon which computer software or other digital content is installed.

While aspects of the invention may be described in terms of programs or processes executed by a Web browser in conjunction with a personal computer or programs or processes executed by a search engine in conjunction with a server computer, those skilled in the art will recognize that those aspects also may be implemented in combination with other program modules. Generally, program modules include routines, subroutines, programs, processes, components, data structures, functions, interfaces, objects, etc., which perform particular tasks or implement particular abstract data types.

Figure 1:
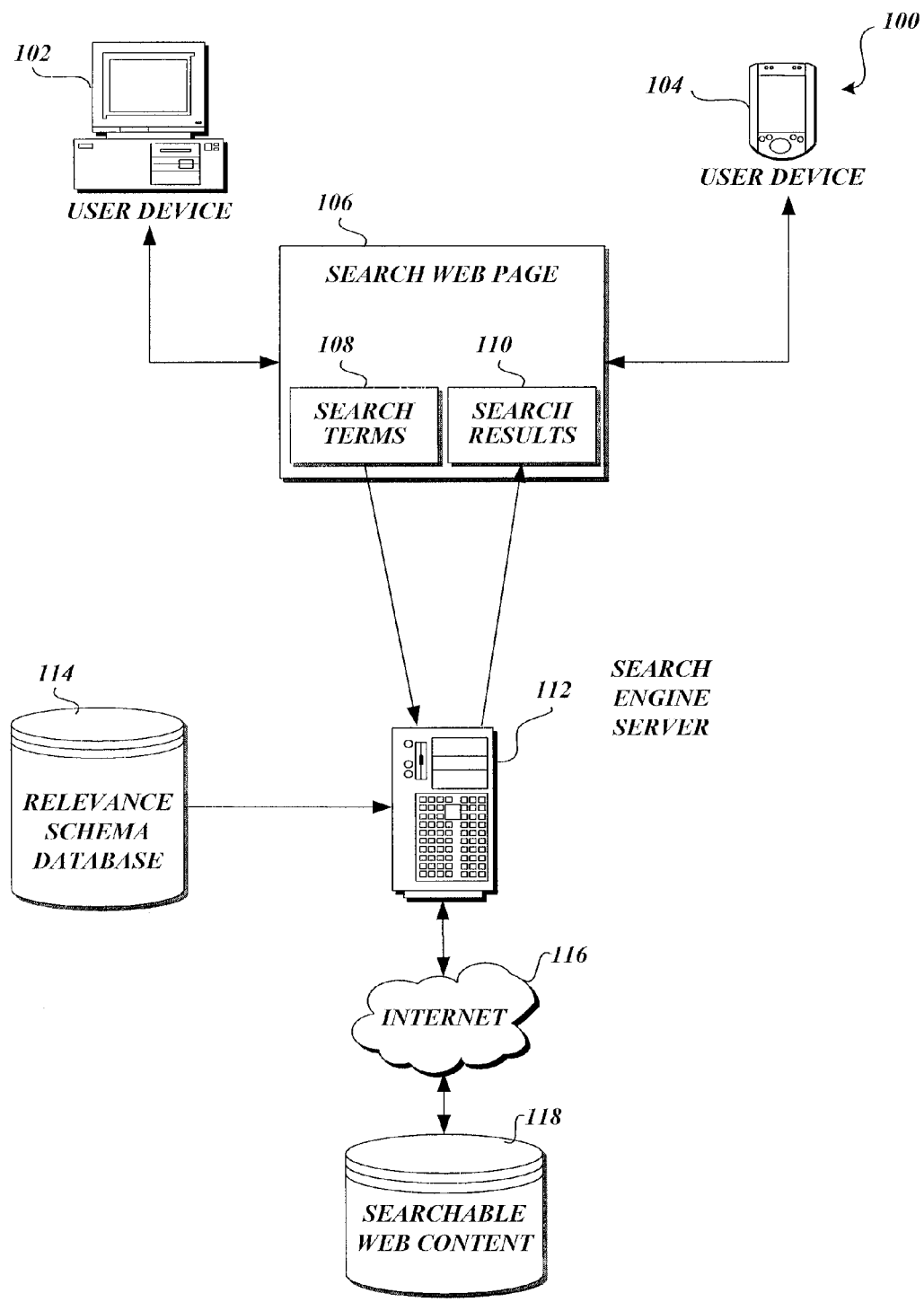
FIG. 1 is a block diagram depicting an exemplary search engine system and one suitable operating environment in which the optimization of search result relevance may be automated, in accordance with the present invention.

FIG. 1 is a depiction of an exemplary search engine system 100 and one suitable operating environment in which the optimization of search results may be automated in accordance with an embodiment of the present invention. As shown, the operating environment includes a search engine server 112 that is generally responsible for providing front-end user communication with various user devices, such as devices 102 and 104, and back-end searching services. The front-end communication provided by the search engine server 112 may include, among other services, generating text and/or graphics organized as a search Web page 106 using hypertext transfer protocols in response to information and search queries received from the various user devices, such as a computer system 102 and a personal digital assistant (PDA) 104. The back-end searching services provided by the search engine server 112 may include, among other services, using the information and search queries received from the various user devices 102, 104 to search for relevant Web content, generating search results 110 representing links to relevant Web content on the search Web page 106, and tracking Web page and search result performance.

In the environment shown in FIG. 1, the search engine server 112 generates a search Web page 106 into which a user may input search terms 108 to initiate a search query for Web content 118 via the Internet 116. The search terms 108 are transmitted to a search engine server 112, which uses the terms to perform a search for Web content 120 that is relevant to the search terms 108 in accordance with a relevance schema 114. The relevance schema 114 is an algorithm that is periodically or continuously updated for use by the search engine to produce the most relevant results possible for any given search. The search engine server 112 relays the relevant Web content as a set of search results 110 for display to the user in the search Web page 106.

In the environment shown in FIG. 1, the user devices 102, 104 communicate with a search engine server 112 via one or more computer networks, such as the Internet 116. Protocols and components for communicating via the Internet are well known to those of ordinary skill in the art of computer network communications. Communication between user devices 102, 104, the search engine server 112, and the relevance schema 114 may also be enabled by local wired or wireless computer network connections. The search engine server 112 depicted in FIG. 1 also may also operate in a distributed computing environment, which can comprise several computer systems that are interconnected via communication links, e.g., using one or more computer networks or direct connections. However, it will be appreciated by those of ordinary skill in the art that the server 112 could equally operate in a computer system having fewer or greater number of components than are illustrated in FIG. 1. Thus, the depiction of the operating environment in FIG. 1 should be taken as exemplary and not limiting the scope of the claims that follow.

Figure 2:
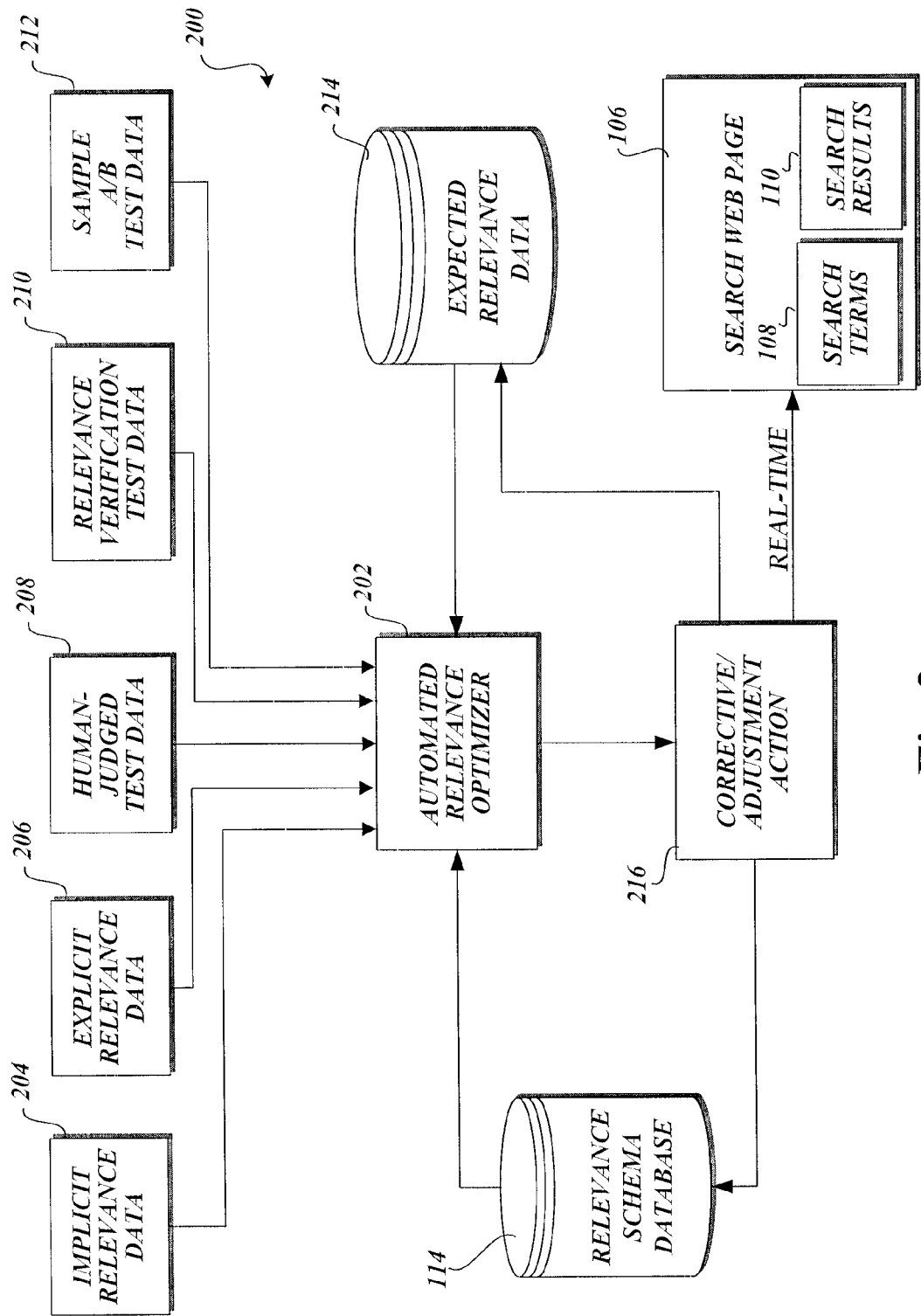
FIG. 2 is a block diagram depicting an automated relevance optimization system for implementing an embodiment of the present invention.

FIG. 2 is a block diagram depicting an automated relevance optimization system 200 for implementing an embodiment of the present invention. In one suitable implementation, the automated relevance optimization system 200 enables a search engine operator to advantageously automate the optimization of search result relevance. The automated relevance optimization system 200 includes an automated relevance optimizer process 202 that operates to collect performance data, diagnose the performance of search results based on the data, and to automatically adjust the operation of the search engine system as needed to optimize the relevance of the search results 110 that are displayed in the search Web page 106.

In one embodiment, the performance data is collected from various sources, as shown in FIG. 2, including, among others, implicit relevance data 204 captured from the user's interaction with the search results 110, e.g., click-through data; explicit relevance data 206 collected when the user makes use of search engine help or support features provided by the search engine operator, or responds to user satisfaction surveys; human-judged test data 208 generated by human judges that periodically evaluates the relevance of search results; relevance verification test data 210 generated from verification tests that verify the validity of search results produced before and after modifications to the search relevance schema 114, i.e., to ensure that adjustments to increase the relevance of search results for one search term have not inadvertently reduced the relevance of search results for another; and sample A/B test data 212 generated from tests on groups of users, e.g., Group A and Group B, to try out adjustments to the operation of the search engine and their affect on the relevance of the search results including the relevance of newly inserted results for which expected performance has not yet been determined, temporary modifications to the search schema to produce new and/or changed results, and other types of temporary modifications to the operation of the search engine.

In one embodiment, the implicit relevance data 204 is measured by the result's click-through rate (CTR), which is determined by comparing the number of times the result is displayed to the number of times a user clicks on the result after it is displayed, i.e., dividing the number of impressions by the number of clicks. The implicit relevance data 204 may also include other data tracked by the search engine server 112, such as the location of the search result 110 when it was displayed on the search Web page 106, and other characteristics of the result that may influence performance, such as the color, size, font, animation, graphics, and adjacent search result performance data. The search engine server 112 is further configured to detect and filter out fraudulent clicks, as is known in the art, such as spam clicking, simulated clicks by robots, and other suspect clicks such as multiple clicks from the same IP address within a certain amount of time or from unidentified sources.

In a preferred embodiment, the implicit relevance data 204 includes data that represents complex user interaction with the search results 108 beyond the result's CTR, since the more complex user interactions are generally better predictors of relevance than the CTR alone. Examples of complex user interactions include, among others, taken alone or in combination, the length of time a result was browsed, whether the result was edited, e-mailed to another party, printed, bookmarked, or whether all or portions of it was cut-and-pasted or otherwise copied for inclusion in the user's other documents.

In one embodiment, the implicit relevance data 204 may be collected for a single interaction, aggregated across all interactions in a given user session of interacting with search results, or further aggregated across all users interactions with the same search results during their own similar searches. For example, a basic unit of implicit relevance data 204 is an atomic measurement of one user, one query, and one result interaction. There may be several atomic measurements for a given session, such as printing a result, bookmarking the result in a favorites folder, sending the result in an e-mail to some friends, etc. By aggregating the atomic measurements for all users and all queries, the implicit relevance data 204 is a sufficiently large and detailed corpus of data that is an excellent predictor of relevance. In a preferred embodiment, the automated relevance optimization system 200 collects implicit relevance data 204, as described in detail in commonly assigned copending U.S. patent application Ser. No. 10/805,873, which is herein incorporated by reference. Other methods of collecting implicit relevance data 204 may be implemented without departing from the scope of the claims that follow, as long as the data is sufficiently large and detailed to be highly predictive of search result relevance.

In one embodiment, the automated relevance optimizer 202 obtains the expected relevance data 214 for the results and compares the data to the actual performance, as reflected in the various sources of performance data 204, 206, 208, 210, and 212. Should the automated relevance optimizer 202 determine that the actual performance falls short of the expected performance, then an action 216 is automatically taken to adjust the operation of the search engine to increase the relevance of results and, therefore, to better their performance. In one embodiment, the automated relevance optimizer 202 determines that the actual performance falls short of the expected performance only after the actual performance falls substantially below a tolerable threshold level of performance for a duration of time. This approach avoids unnecessary adjustments when the actual performance of a result happens to be erratic.

In one embodiment, the action 216 includes, among others, changes to the relevance schema database 114 to change the search algorithm so that the next time a search is invoked for the search term in question, a different (and improved) set of search results is produced as compared to results produced in previous searches. For example, a particular result appearing in the original set of results may be removed or re-ranked to appear further down the list of results so that a new result may be inserted in its place, all in accordance with the updated search algorithm as reflected in the changed relevance schema database 114. In another embodiment, the actions 216 might include changes to the search results that are applied in real time. For example, the automated relevance optimizer 202 may intercept the search results 110 produced by the search engine 112 in accordance with the existing relevance schema 114 and apply an adjustment 216 before the search results are conveyed to the user device 102, 104 based on an up-to-the-minute diagnosis of poor performance of the results when previously displayed to other users during the last several hours.

In one embodiment, the action 216 includes, among others, changes to the expected relevance data 214 so that, the next time a search is invoked for the search term, the expected values used to measure the performance of the results are modified to better reflect the performance that the search engine operator expects before making other modifications to other aspects of the operation of the search engine.

Of course, it is understood that a combination of several of the above-described actions 216 may be taken without departing from the scope of the claims that follow. For example, the automated relevance optimizer 202 may automatically insert a new result in the search results 110 of a poor-performing search, while at the same time automatically changing the expected relevance data 214 to a lower value for an initial period of time in order to test the performance of the new result. Once a more definitive performance expectation can be ascertained, then the expected relevance data 214 may be changed accordingly.

Figure 3:
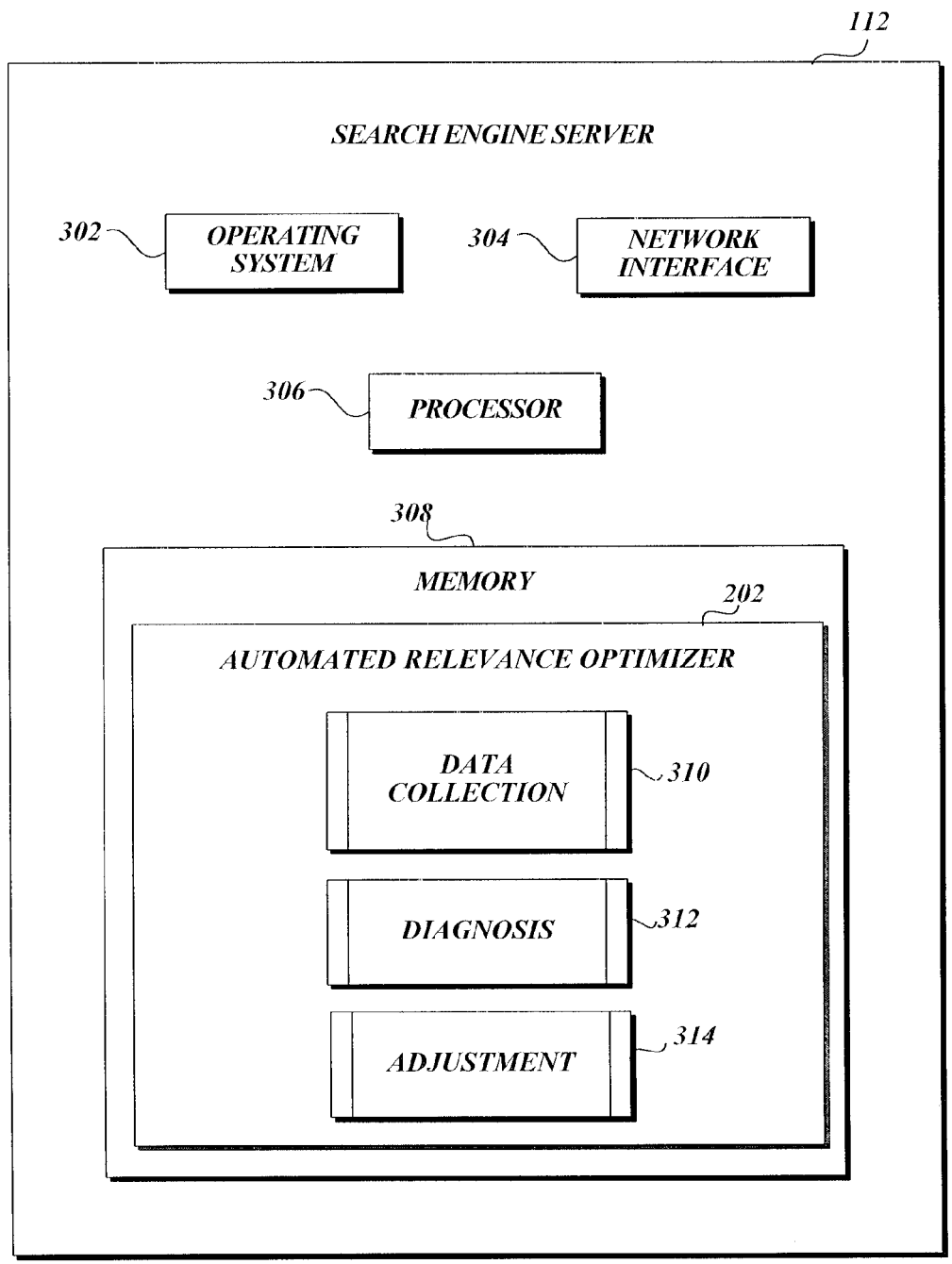
FIG. 3 is a block diagram depicting in further detail an arrangement of certain components of the automated relevance optimization system of FIG. 2 implemented in a search engine server of FIG. 1, in accordance with an embodiment of the present invention.

FIG. 3 is a block diagram depicting in further detail an arrangement of certain exemplary computing components of the search engine server 112 that are responsible for the operation of the automated relevance optimization system 200 shown in FIG. 2. Specifically, the search engine server 112 is shown including an operating system 302, processor 306, and memory 308 to implement executable program instructions for the general administration and operation of the search engine server 112. The search engine server 112 further includes a network interface 304 to communicate with a network, such as the Internet 116, to respond to user search terms 108 and to provide search results 110. Suitable implementations for the operating system 302, processor 306, memory 308, and network interface 304 are known or commercially available, and are readily implemented by persons having ordinary skill in the art—particularly in light of the disclosure herein.

The memory 308 of the search engine server 112 includes computer executable program instructions comprising the automated relevance optimizer process 202. The automated relevance optimizer process 202 includes, among others, a data collection process 310, a diagnostic process 312, and an adjustment process 314. The data collection process 310 is responsible for collecting performance data from the various sources previously described with reference to FIG. 2, including the implicit relevance data 204, the explicit relevance data 206, the human-judged test data 208, the relevance verification test data 210, and the sample A/B test data 212. The data collection process 310 further normalizes the performance data based on the relative importance of the source from which the data originates. In a preferred embodiment, the implicit relevance data 204 is weighted most heavily, as it is generally considered to be a better and more objective predictor of relevance than the other sources of data. Nevertheless, in some embodiments, other performance data, such as human-judged test data, may override the implicit relevance data 204. The normalized performance data is combined in preparation for comparison with expected performance data 214.

In one embodiment, the diagnostic process 312 compares the combined and normalized performance data to the expected performance data 214. When the comparison indicates that the search results 110 are under performing, the diagnostic process 312 attempts to determine the cause. For example, an under performing result may be linked to an inoperative Web site, a web page that is no longer current, or a document that is no longer valid. In some cases, the result may be located in section of the Web page 106 or presented in such a way relative to the other results that is not as visible to the user as it could be.

An under performing result may have more to do with the search term 108 than the search result 110. For instance, in some cases the search term may be one that is easily misspelled, or is too general to produce meaningful results. As an example, when a user enters the search term "Schwarzenegger" he or she is likely to misspell or mistype the name and get unwanted results. On the other hand, when the user enters the term "Arnold" he or she is likely to spell and type the term correctly, but the search term is so general, he or she will also get many unwanted results.

Once the cause of the under performing result is determined, the adjustment process 314 is responsible for generating an appropriate action 216 to take. As already described, in one embodiment, the adjustment process 314 may generate an action 216 to modify the relevance schema database 114 to produce an optimized set of search results 110 during the next iteration of the search for the search term. Alternatively, the adjustment process 314 may generate an action 216 to intercept the search results 110 before they are displayed to the user device 102, 104, and to automatically optimize the search results in real time. In still other embodiments, the adjustment process 314 may generate an action 216 to optimize the search results by changing the way the search results are presented on the Web page 106, rather than making substantive changes to the search results themselves. In still other embodiments, the adjustment process 314 may generate an action 216 to cause the search engine server 112 to automatically prompt the user to clarify the search term with suggested spellings or additional terms. It is understood that the adjustment process 314 may generate other actions 216 to adjust the operation of the search engine, and combine actions 216 without departing from the scope of the claims that follow.

Figure 4A:
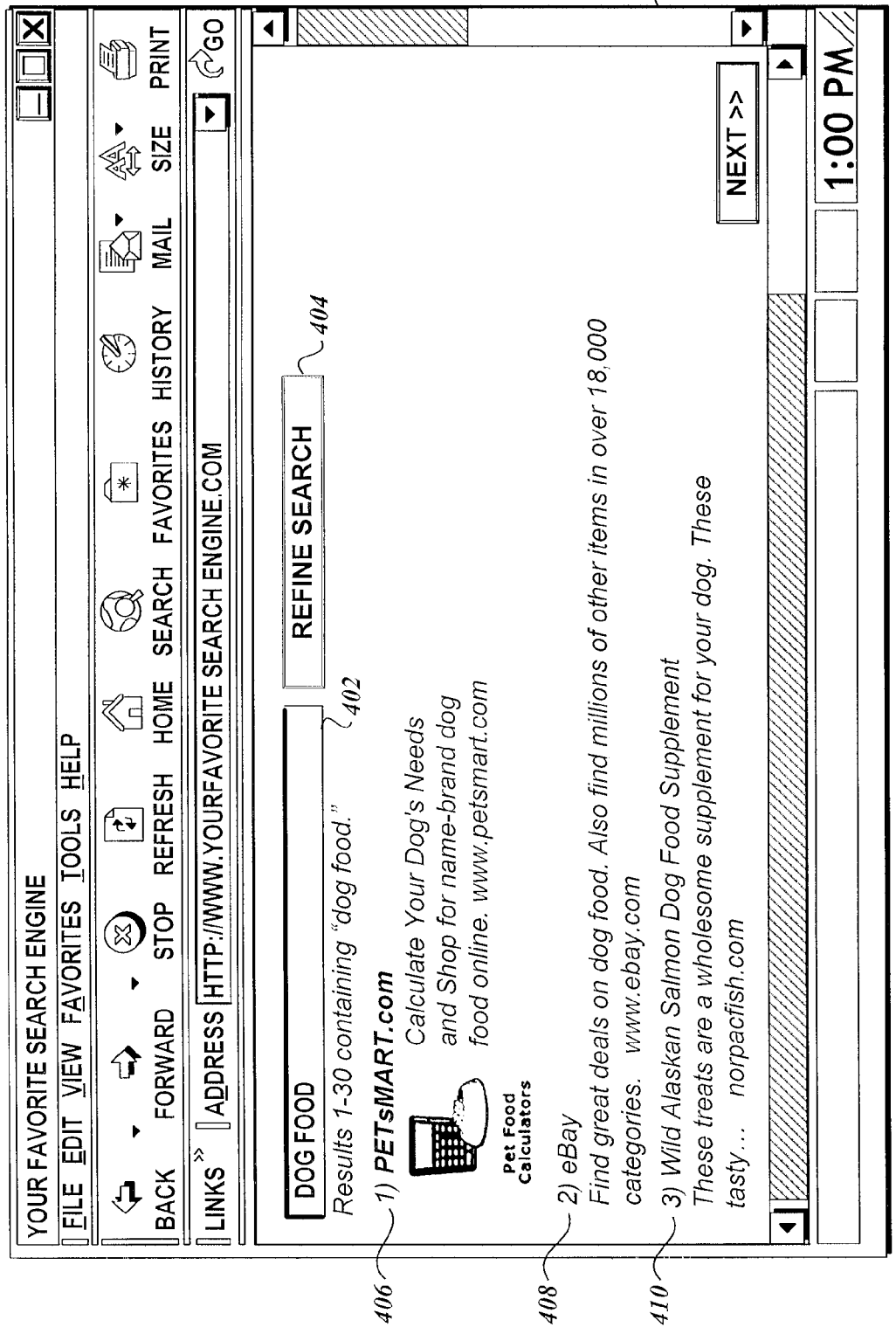
FIG. 4A is a pictorial diagram of an exemplary search engine user interface for implementing an embodiment of the present invention.

FIG. 4A illustrates a browser program 400 displaying a search Web page 106 in which is depicted an exemplary search engine user interface for implementing an embodiment of the present invention. The Web page 106 (FIG. 1) may be generated by the search engine server 112 (FIGS. 1, 2) and delivered to the user's computing device 102, 104 via the Internet 116 (FIG. 1). The search engine user interface displays the previously entered search terms 108 (FIG. 1) in the text box 402, and prompts the user to refine the search with additional search terms, if desired, using the command button labeled "REFINE SEARCH" 404.

In the illustrated example in FIG. 4A, the user has entered the search term "DOG FOOD." The search results are generated from a search of Web content 118 via the Internet 116. As is known in the art, the search engine 112 may execute program instructions that analyze the results and rank the "best" results for display to the user according to a predetermined criterion, such as which results are most relevant in accordance with the relevance schema database 114. The best results are generally displayed at the top of a set of results. In one embodiment, the search results may be displayed in different sections of a Web page 106, such as in a local section where the results are obtained from Web content 118 that has a local connection to the user that entered the search, e.g., Yellow Pages listings. It is understood that the search results may be displayed in a variety of different formats and in different locations on the Web page 106 without departing from the scope of the claims that follow.

By way of example only, three search results generated for the search term "DOG FOOD" are displayed directly beneath the redisplayed search entry box 402: (1) PETsMART® search result at reference numeral 406; (2) eBAY® result at reference numeral 408; and (3) Wild Alaska Salmon® Dog Food Supplement result at reference numeral 410. For purposes of illustration it is assumed that these three search results for the search term "DOG FOOD" have not yet been optimized in accordance with an embodiment of the invention, but are displayed in the order shown in accordance with the relevance schema database 114 as it existed at 1:00 p.m. The expected performance for each of the three results is listed in Table 1 below:

TABLE 1

| RESULT | EXPECTED CTR |
| --- | --- |
| PETsMART ® (406) | 15% |
| eBAY ® (408) | 10% |
| Wild Alaskan Salmon ® (410) | 8% |

In one embodiment, during the operation of the automated relevance optimizer 202, the implicit relevance data 204 (FIG. 2) is collected in the form of a CTR for each of the search results 406, 408, and 410, as aggregated for all users who have recently entered similar searches and obtained the illustrated search results for "DOG FOOD." In the illustrated example, the implicit relevance data 204 reveals that the actual performance of each of the search results 406, 408, and 410 is different than what was expected, and two other search results not appearing on the first page of the search results illustrated in FIG. 4A actually outperformed all of them, as shown in Table 2 below:

TABLE 2

| RESULT | ACTUAL CTR |
| --- | --- |
| PETsMART ® (406) | 8% |
| eBAY ® (408) | 10% |
| Wild Alaskan Salmon ® (410) | 5% |
| PETCO ® (418, see FIG. 4B) | 9% |
| Amazon.com ® (416, see FIG. 4B) | 20% |

In the illustrated example, since the actual performance of two of the search results, PETsMART® 406 and Wild Alaskan Salmon® 410 have fallen short of the expected results, the automated relevance optimizer 202 diagnoses the possible causes of the under performing results 406, 410 and takes an action 216 to automatically update the relevance schema database 114 so that the next time a search for "DOG FOOD" is entered, the user will see a different set of search results, namely the search results for Amazon.com® 416 and PETCO® 418 listed in Table 2, based on their superior performance.

Figure 4B:
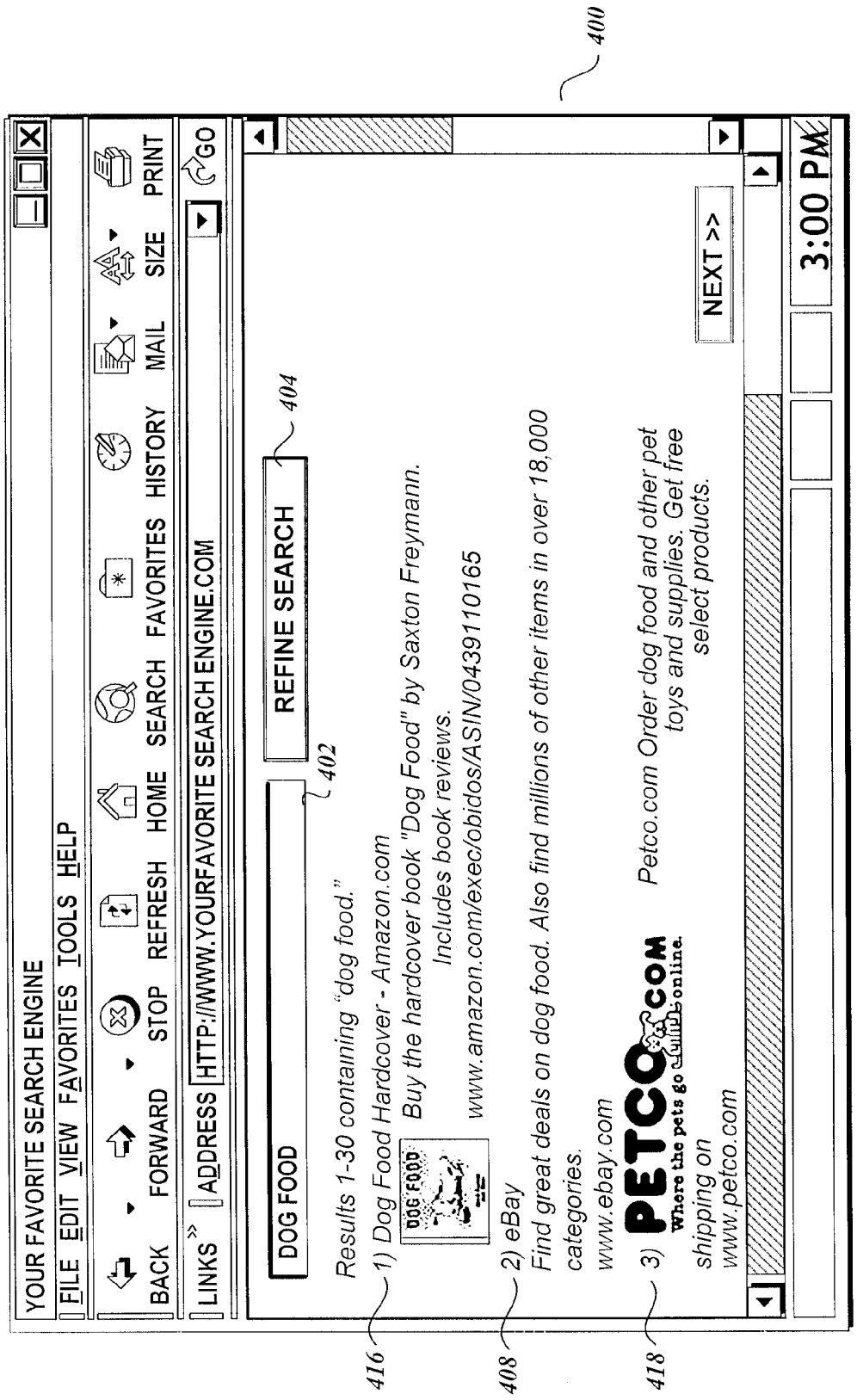
FIG. 4B is a pictorial diagram of the exemplary search engine user interface of FIG. 4A at a later time, after the search results have been automatically optimized in accordance with an embodiment of the present invention.

FIG. 4B illustrates the browser program 400 displaying another Web page, this time generated later at 3:00 p.m., as displayed at time box 416, after the automated relevance optimizer 202 has taken an action 216 to automatically optimize the relevance of the search results by updating the relevance schema database 114, and again in which the search results for a search term "DOG FOOD" are displayed. In the illustrated example, since the actual performance for the PETsMART® search result 406 that originally appeared at the top of the set of search results 110 at 1:00 p.m. did not justify keeping it there, the search result for PETsMART® has been eliminated, as shown in FIG. 4B (or at least moved to a subsequent page). Likewise, since the actual performance for the Wild Alaskan Salmon® search result 410 that originally appeared in the third position on the first page of the set of search results 110 at 1:00 p.m. did not justify keeping it there, it too has also been eliminated, as shown in FIG. 4B (or at least moved to a subsequent page). In place of the under performing results 406, 410 the search engine server 112 has instead inserted new search results for Amazon.com® at reference numeral 416 and PETCO® at reference numeral 418, in accordance with the relevance schema database 114 as updated by action 216 since the earlier 1:00 p.m. time. The Amazon.com® result 416 now appears at the top of the set of search results 110, and the PETCO® result 418 appears in the third position. The eBAY® result 408 remains in the second position as the relevance schema database 114 was unchanged with regard to eBAY®, since the result was meeting expected performance levels.

Note that in the above example, the Amazon.com® result 416 has nothing to do with actual dog food, as do the other results, such as PETCO® 416 and eBAY® 408. Thus, from a purely human-judged standpoint, the new set of search results may seem less relevant to the search term "DOG FOOD." But the high performance CTR of 20% revealed a trend that human judges may have missed, and that conventional content analysis may have missed, namely, that the book may, at least temporarily, be a hot best-selling book that users are interested in purchasing as gifts during the holiday season. Thus, the highly predictive implicit relevance data 204 may outweigh the human-judged data 208, and produce an optimal set of results that is highly relevant and satisfactory for the majority of users. In one embodiment, another action 216 that the automated relevance optimizer 202 might have taken instead of, or in addition to, updating the relevance schema database 114, would be to adjust the operation of the search engine 112 to prompt users that enter "DOG FOOD" as their search term, to further clarify whether they want a result for the new best-selling book titled "DOG FOOD," or whether they want the usual results to information about dog food itself, and where to buy dog food, etc. Once the popularity of the book "DOG FOOD" fades away, the automated relevance optimizer 202 would likely take the opposite actions to update the schema 114 to eliminate the Amazon.com® result 416 and remove any prompting of the users to clarify their search. In this way, the search engine operator is able to automate the optimization of the search results to provide more relevant and timely results for users, and possibly even to generate more revenue for the search engine in increased traffic.

It is understood that the above example is presented by way of illustration only. In a preferred embodiment, the implicit relevance data 204 would reflect more complex user behavior than the CTR alone. For example, the implicit relevance data 204 would reflect the aggregation of a number of user behaviors with respect to the results in question, such as e-mailing the uniform record locator (URL) of the PETCO® result 418 to one or more friends, making a purchase at the PETCO® Web site to which the result is linked, etc. Such complex behaviors are generally considered to be more predictive of relevance than the CTR alone.

Figure 5A:
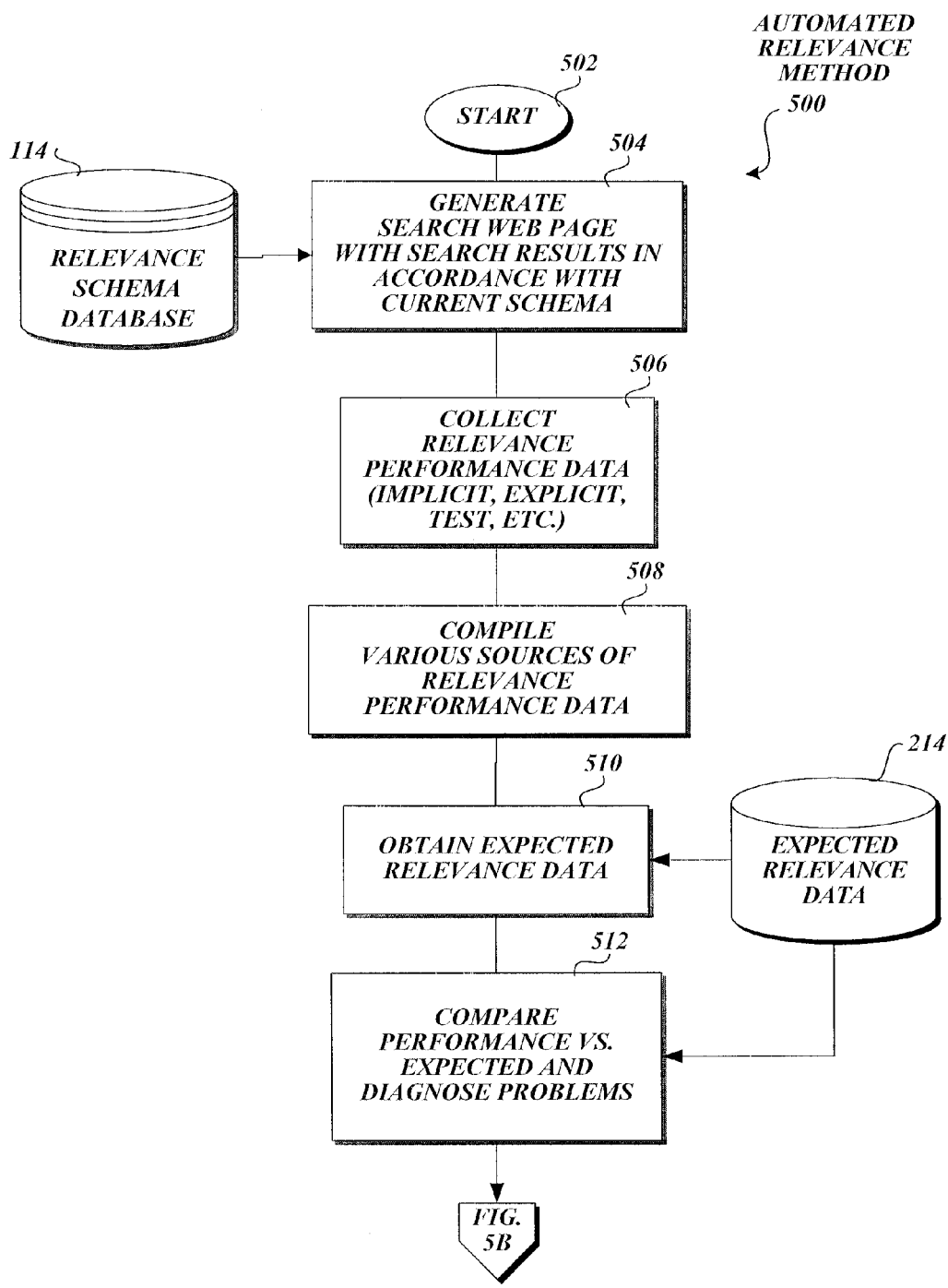
FIGS. 5A-5B are flow diagrams illustrating the logic performed in conjunction with the automated relevance optimization system of FIGS. 2 and 3 for automating the optimization of search result relevance in a search engine in accordance with an embodiment of the present invention.
Figure 5B:
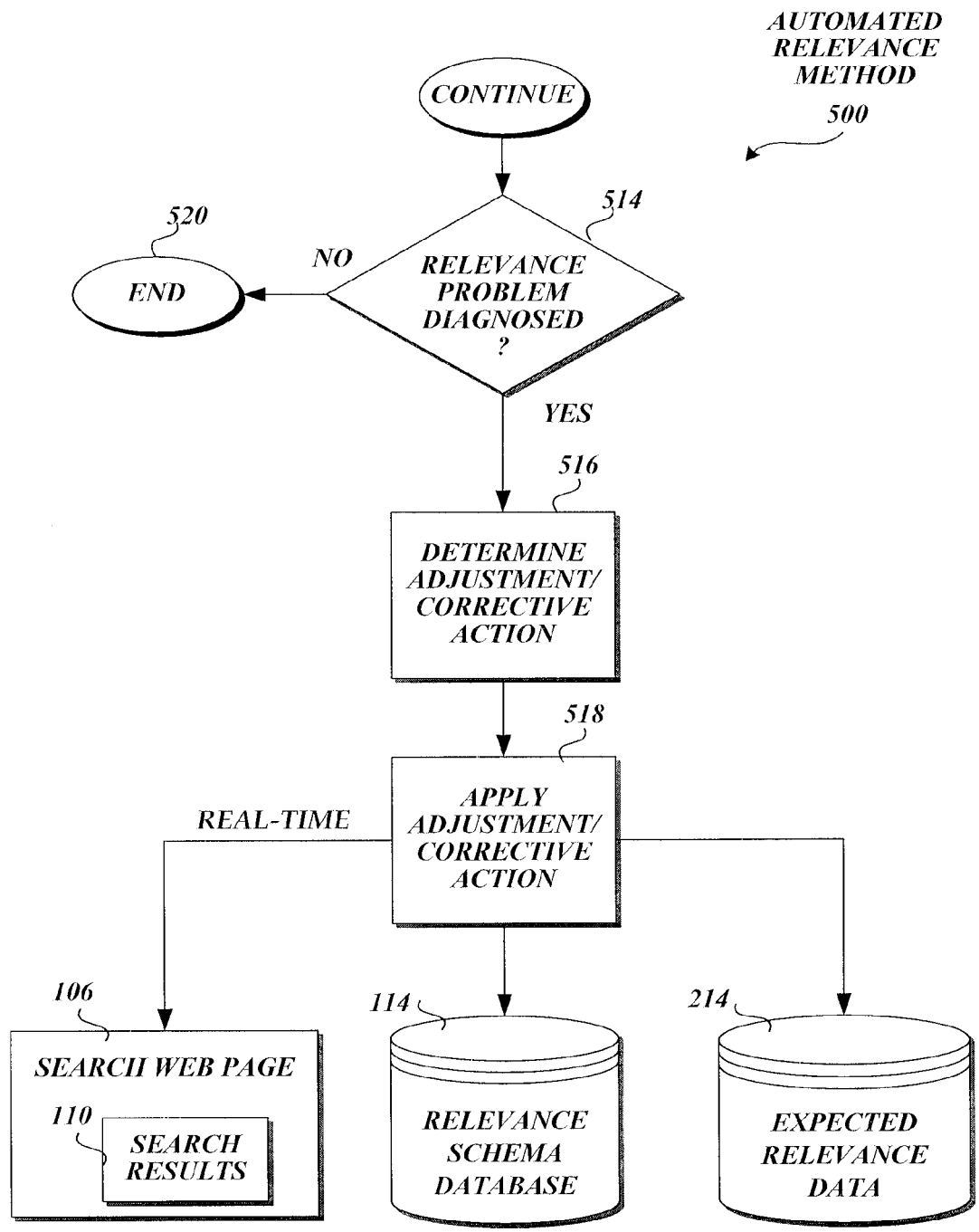

FIGS. 5A-5B are flow diagrams illustrating the logic performed by a relevance optimizer method 500 for automating the optimization of search results in a search engine in accordance with an embodiment of the present invention. The search engine server 112 begins at the start block 502 and continues at processing block 504 to generate the search Web page 106 with search results 110 (FIG. 1) in accordance with the existing relevance schema database 114. At processing block 506, the automated relevance optimizer process 202 collects the relevance performance data for the search results 110 from various sources, including the implicit relevance data 204, the explicit relevance data 206, the human-judged test data 208, the relevance verification test data 210, and the sample A/B test data 212. In one embodiment, collecting the implicit relevance data 204 may include aggregating the data across a local user's session or across multiple sessions, or even across multiple users where cross-user data is available from the search engine server 112. Alternatively, the implicit relevance data 204 may be already aggregated by the search engine server 112 for use by the automated relevance optimizer process 202. In any event, processing continues at process block 508, where the automated relevance optimizer process 202 compiles the various sources of collected relevance performance data into a measurement of the actual performance of a result or results under consideration, including normializing the various sources of performance data in accordance with their relative importance. In one embodiment, the relative importance of the various sources is a measure of their value in predicting the relevance of search results, and that value may be predefined by the search engine operator, and further changed from time to time to aid the operator in fine-tuning the automated relevance optimization process. In a preferred embodiment, the value of the implicit relevance data 204 is likely to be higher than other sources of relevance performance data because it may be highly predictive due to the potentially large scale of data collection and rapidity with which the data may be collected.

In one embodiment, the automated relevance optimizer method 500 continues at process block 510 to obtain the expected relevance data 214 for the search result or results under consideration. The expected relevance data 214 may be predefined by the search engine operator and changed from time to time to reflect changes in the expected performance of search results over time. In one embodiment, the expected relevance data 214 may have even been changed or otherwise updated by an action 216 generated by a previous iteration of the automated relevance optimizer 202 to reflect any automated changes in expectations.

In one embodiment, the automated relevance optimizer method 500 continues at process block 512 to compare the measurement of the actual performance of a result or results under consideration to the expected performance, where the actual performance was determined at process block 508, and the expected performance was determined at process block 510. When the comparison is unfavorable, e.g., the actual performance fall short or substantially short of the expected performance, the search results are underperforming, which may indicate a problem with the relevance of the search results. The automated relevance optimizer process attempts to diagnose the possible cause or causes of the problem. For example, in some cases the result is obsolete and other newer results are now more relevant, as reflected, for example, in the implicit relevance data 204 collected for the results. In other cases, the search term for which the search results were generated is too broad or easily misspelled, and requires the search engine to prompt the user to clarify the terms. Numerous other diagnoses of possible causes of the problem may be made without departing from the scope of the claims that follow.

In FIG. 5B the automated relevance optimizer method 500 continues at decision block 514 to determine whether a problem with the relevance of the search results has been diagnosed. If not, the automated relevance optimizer 202 ends at termination oval 520. Otherwise, processing continues at process block 516, where the automated relevance optimizer 202 determines what adjustment or corrective action 216 (FIG. 2) to generate in an effort to address the problem. As further illustrated in FIG. 5, the adjustment or corrective action 216 is applied at block 518. As described earlier, the action 216 may include adjustments to the search engine operation that cause the user to be prompted to clarify or narrow the search term in cases where the problem is related to the search term being too general or easily misspelled. In one embodiment, the action 216 may include a modification, either temporary or permanent, to the relevance schema database 114, or even modifications to the expected relevance data 214. In still another embodiment, the action 216 may comprise one or more modifications to the search results 108 on the search Web page 106 in real time, where the search results 110 that were generated by the search engine 112 are intercepted and reranked, reordered, reformatted, removed, replaced with other results, or otherwise modified in an effort to optimize the search result relevance for the user. Combinations of above-described actions 216 may be employed as well without departing from the scope of the claims that follow.

While the presently preferred embodiments of the invention have been illustrated and described, it will be appreciated that various changes may be made therein without departing from the spirit and scope of the invention. For example, as already described, in one embodiment of the present invention, the automated relevance optimizer method 500 and associated subprocesses for data collection 310, diagnosis 312, and adjustment 314, may be implemented in real time to allow for up-to-the-minute optimizations based on the latest performance data captured by the search engine server 112 and collected by the automated relevance optimizer 202. In another embodiment, the automated relevance optimizer method 500 processes may be implemented in batch mode to allow for data collection of performance data from a variety of sources, including implicit relevance data 204, explicit relevance data 206, human-judged test data, relevance verification test data 210, and sample A/B test data 212, and a combination of automated and manual optimizations of search results. In yet other embodiments, the automated optimization search result relevance optimizer method 500 may be limited in application to consideration of less than all sources of performance data, e.g., limited to the implicit relevance data 204, as well as limited in application to only certain types of actions 216, such as permanent modifications to the relevance schema database 114, real time updates to the relevance schema database 114 or to the search results 110, or any combination thereof.

The embodiments of the invention in which an exclusive property or privilege is claimed are defined as follows:

1. A method for automating the optimization of search results displayed in a search Web page, the method comprising:

receiving search results provided from a search engine to a user according to a search term, wherein the search results are selected and ranked by a relevance schema;

collecting data that represents a performance of each of the received search results, the collected data quantifying interactions of various users with the search results, the collected data originating from at least one of a plurality of various sources having various types of valuations, the search results and collected data being initially incomparable against each other absent normalization, wherein the various sources reflect data of quantified interactions of the various users with the search results;

combining the collected data by a normalization procedure that generates performance data for each of the search results, wherein the performance data reflects behavior of the various users, and wherein the normalization procedure comprises:

(1) aggregating the collected data from the various sources;

(2) compiling various types of valuations, associated with the aggregated data, into common measurements;

(3) weighting the common measurements based on relative importance of the various sources, wherein the relative importance is a reflection of a value of each of the various sources as a predictor of relevance of the search results; and (4) normalizing the weighted common measurements to determine performance data associated with each of the search results such that the search results are comparable against each other and such that the normalized performance data is comparable against expected performance data of the search results;

determining whether the expected performance data is below the normalized performance data by comparing the normalized performance data to the expected performance data for each of the search results;

when the normalized performance data of a search result of the search results is below the expected performance data associated therewith, identifying the search result as underperforming and diagnosing the underperforming search result based on results of the comparison between the normalized performance data and the expected performance data; and updating the relevance schema based on the diagnosis such that operation of a search engine that provided the search results is adjusted to improve relevance of subsequent search results.

2. The method of claim 1, wherein the various sources of performance data includes one of an implicit performance data, an explicit performance data, a human-judged performance data, a relevance verification data, and a sample test data.

3. The method of claim 1, wherein the normalization procedure includes giving greater weight to the collected data that describes a user's interactions that receives the search results in relation to the various users.

4. The method of claim 2, wherein comparing the normalized performance data against the expected performance data includes identifying the search result as underperforming when the normalized performance data for the search result is a quantified threshold below the expected performance data.

5. The method of claim 2, wherein the most important source of data is implicit performance data, and the normalization procedure includes giving the implicit performance data greater weight when combining the collected data.

6. The method of claim 5, wherein the implicit performance data is automatically captured when a user that is provided the search results interacts with the search results.

7. The method of claim 6, wherein the implicit performance data includes at least one of whether the user clicked on the result, a location of the result when the user clicked the result, and a length of time that the user browsed the result.

8. The method of claim 7, wherein the implicit performance data further identifies an operation that the user performed on the result, including at least one of editing, e-mailing, printing, bookmarking, and copying.

9. The method of claim 6, wherein the implicit performance data includes captured data that has been aggregated across multiple interactions with the search result.

10. The method of claim 6, wherein the implicit performance data includes captured data that has been aggregated across multiple users interacting with the search result.

11. The method of claim 2, wherein the explicit performance data includes data obtained from at least one user responses to a search engine operator-generated inquiry about the search results wherein the inquiry includes one of an on-line inquiry and a telephone inquiry.

12. The method of claim 2, wherein the human-judged performance data includes data obtained from a human evaluation of the search result.

13. The method of claim 2, wherein the relevance verification data includes data obtained from a verification test of the search result's relevance to verify whether a search result having a known relevance is still included in the search result generated by the search engine.

14. The method of claim 2, wherein the sample test data includes data obtained from a test of the search result's relevance performed on a sample of a subset of users.

15. The method of claim 2, wherein diagnosing at least one possible cause for the underperforming search result includes making the following determinations:
   determine at least one of whether the search result is no longer valid;
   determine whether the search result appears in a poor location;
   determine whether the search term that generated the search result is easily misspelled; and
   determine whether a search for the search term should be constrained to a specific resource.

16. The method of claim 2, wherein adjusting the operation of the search engine that provided the search results in accordance with the diagnosis, includes modifying the search engine's search schema to change the subsequent search result generated for the search term by reranking, removing, or replacing the search results.

17. The method of claim 2, wherein adjusting the operation of the search engine that provided the search results in accordance with the diagnosis, includes modifying the search engine's search schema to augment a presentation of the search results generated for the search term, including at least one of highlighting, animating, enlarging, and repositioning an appearance of the search result on a search results web page.

18. The method of claim 2, wherein adjusting the operation of the search engine that provided the search results in accordance with the diagnosis, includes increasing the search engine's spellchecker tolerance.

19. The method of claim 2, wherein adjusting the operation of the search engine that provided the search results in accordance with the diagnosis, includes prompting the user to one of clarify or narrow the search term with an additional user input.

20. The method of claim 2, wherein adjusting the operation of the search engine that provided the search results in accordance with the diagnosis, includes temporarily adjusting the operation of the search engine, and determining whether the adjustments have actually improved the search result performance before permanently adjusting the operation of the search engine.

21. The method of claim 2, wherein adjusting the operation of the search engine that provided the search results in accordance with the diagnosis, includes adjusting the operation of the search engine in real time.

22. The method of claim 21, wherein adjusting the operation of the search engine in real time includes intercepting the search result generated by the search engine and modifying the search result before the search engine displays the search result to the user.

23. An automated search result optimization system implemented in a computer that provides search results to a user, comprising:
   an input component to receive input data representing a performance of a search result generated by a search engine that is executed on the computer for a search term, the input data originating from a plurality of various sources;
   a data collection processor to collect the input performance data from the plurality of various sources wherein the input performance data collected includes implicit performance data that describes an aggregation of various users interactions during various sessions with the search result, wherein the input performance data from one of the plurality of various sources is initially incomparable against the input performance data from another of the plurality of various sources and the search results are initially incomparable against each other absent normalization, wherein the plurality of various sources reflecting collected input performance data;

a comparison processor to compare the collected input performance data of the search result to an expected performance data of the search result, wherein comparing comprises normalizing input performance data by the following steps:
(1) aggregating the collected input performance data from the plurality of various sources;
(2) compiling various types of valuations, associated with the aggregated collected input performance data, into common measurements; and
(3) normalizing the common measurements to determine common input performance data associated with each of the search results such that search results are comparable against each other and such that normalized input performance data of search results is comparable against expected performance data of the search results;

a diagnostic processor to determine, based on the comparison, whether the collected input performance data diverges from the expected performance data by a quantified threshold, and if so, identify the search result as underperforming and diagnose the underperforming search result utilizing results of the comparison to select from a set of predefined corrective actions, wherein one of the set of corrective actions is implementing an adjustment processor; and the adjustment processor to automatically adjust operation of the search engine, wherein the adjusted operation of the search engine improves the performance of the search result by tailoring a ranking of subsequent search results in accordance with the collected input performance data, and wherein an increased weight is attached to the collected input performance data from one or more of the various sources based on the implicit performance data thereby influencing the automatic adjustment of the operation of the search engine.

24. The system of claim 23, wherein the at least one of the plurality of sources of input performance data includes one of the implicit performance data, an explicit performance data, a human-judged performance data, a relevance verification data, and a sample test data.

25. The system of claim 23, wherein the data collection process includes a normalizing process to normalize the collected data in accordance with a relative importance of a source of the collected data within the plurality of various sources, and further wherein normalizing includes giving greater weight to the collected data from the more important sources and combining the collected data to reflect the relative importance of the source from which the collected data originated.

26. The system of claim 25, wherein the diagnostic processor compares the performance of the search result as represented by the normalized collected performance data to the expected performance data of the search result, and wherein the search result is underperforming when the performance is lower than the quantified threshold below the expected performance data.

27. The system of claim 25, wherein the most important source of data is implicit performance data, and normalizing the collected input performance data includes giving the implicit performance data greater weight, in relation to a balance of the collected input performance data, when combining the data.

28. The system of claim 27, wherein the implicit performance data is automatically captured when the user interacts with the search result.

29. The system of claim 28, wherein the implicit performance data includes at least one of whether the user clicked on the search result, a location of the search result when the user clicked the search result, and a length of time that the user browsed the search result.

30. The system of claim 29, wherein the implicit performance data further includes data representing an identification of an operation that the user performed on the search result, including at least one of editing, e-mailing, printing, bookmarking, and copying.

31. The system of claim 28, wherein the implicit performance data includes captured data that has been aggregated across multiple interactions with the search result.

32. The system of claim 28, wherein the implicit performance data includes captured data that has been aggregated across multiple users interacting with the search result.

33. The system of claim 24, wherein the explicit performance data includes data obtained from the user's response to a search engine operator-generated user-satisfaction survey about the search result.

34. The system of claim 24, wherein the human-judged performance data includes data obtained from a human evaluation of the search result.

35. The system of claim 24, wherein the relevance verification data includes data obtained from a verification test of the search result's relevance to verify whether a search result having a known relevance is still included in the search result generated by the search engine.

36. The system of claim 24, wherein the sample test data includes data obtained from a test of the search result's relevance performed on a sample of a subset of users.

37. The system of claim 24, wherein the diagnostic processor is further configured to diagnose at least one possible reason why the performance of the underperforming search result compares unfavorably against the expected performance data, wherein the reason is determined upon executing one or more of a set of processes comprising considering whether the search result is no longer valid, considering whether the search result appears in a poor location, whether a search term that generated the search result is easily misspelled, considering whether the search term is too broad to generate a meaningful result, or considering whether a search for the search term should be constrained to a specific resource.

38. The system of claim 23, wherein the adjustment processor is further configured to generate output data that represents an action to modify the search engine's search schema, wherein the modified search schema changes the way the search engine generates search results for a search term, including at least one of reranking, removing, and replacing the search result.

39. The system of claim 23, wherein the adjustment processor is further configured to generate output data that represents an action to modify the search engine's search schema, wherein the modified search schema augments the way the search engine presents the search result for a search term, including at least one of highlighting, animating, enlarging, and repositioning an appearance of the search result on a search result Web page.

40. The system of claim 23, wherein the adjustment processor is further configured to generate output data that represents an action to increase the search engine's spellchecker tolerance.

41. The system of claim 23, wherein the adjustment processor is further configured to generate output data that represents an action to prompt the user to one of clarify or narrow the search term with an additional user input.

42. The system of claim 23, wherein the adjustment processor is further configured to generate output data that represents an action to temporarily adjust the operation of the search engine, and to further determine whether the temporary adjustment has actually improved the search result performance before generating an action to permanently adjust the operation of the search engine.

43. The system of claim 23, wherein the adjustment processor is further configured to generate output data that represents an action to adjust the operation of the search engine in real time.

44. The system of claim 43 wherein the action to adjust the operation of the search engine in real time includes an action to intercept the search result generated by the search engine and to further modify the search result before the search engine displays the search result to the user.

45. One or more computer-accessible media having instructions stored on the media for facilitating the automated optimization of a search result in a search result user interface, the instructions comprising:
receiving search results provided by a search engine in response to an inputted search term from a user;
collecting data that represents a performance of each search result of the search results from at least one of a plurality of various sources of performance data that includes implicit data collected by quantifying interactions of various users during various sessions with each of the search results, wherein the performance data from one of the plurality of various sources is initially incomparable against the performance data from another of the plurality of various sources and the search results are initially incomparable against each other absent normalization, wherein the plurality of various sources reflecting the performance data quantifying interactions of various users;
normalizing the collected performance data in accordance with a relative importance associated with each of the various sources of the performance data, wherein normalizing comprises formatting the performance data in a common measurement that is associated with each of the search results such that the search results are comparable against each other and such that normalized performance data of search results is comparable against expected performance data of search results;
comparing the normalized performance data against the expected performance data for each search result;
based on the comparison, determining whether the normalized collected performance data diverges from the expected performance data by a quantified threshold and identifying a search result, of the search results, as underperforming when it is associated with divergent normalized collected performance data;
diagnosing at least one possible cause for the underperforming search result based on a result of the comparison between the normalized performance data and the expected performance data;
utilizing the at least one possible cause to select from a set of predefined corrective actions, wherein one of the set of corrective actions is adjusting an operation of the search engine accordance with the normalized collected performance data.

46. The computer-accessible media of claim 45, wherein the at least one of the plurality of various sources of performance data includes one of the implicit performance data, an explicit performance data, a human-judged performance data, a relevance verification data, and a sample test data.

47. The computer-accessible media of claim 45, wherein the instruction to normalize the collected performance data that describes the user's interactions with the search results in accordance with a relative importance of the source of the performance data includes instructions to give greater weight to the performance data from the more importance sources of the at least one of the plurality of various sources and to combine the performance data to reflect the relative importance of the source from which the performance data originated.

48. The computer-accessible media of claim 45, wherein the instruction to compare the normalized performance data to the expected performance data includes an instruction to determine that the search result is underperforming when the normalized performance data is the quantified threshold below the expected performance data.

49. The computer-accessible media of claim 47, wherein the most important source of data is the implicit performance data, and the instruction to normalize the collected performance data includes an instruction to give implicit performance data greater weight when combining the performance data.

50. The computer-accessible media of claim 46, wherein the implicit performance data is data that is automatically captured by a search engine when a user interacts with a search result.

51. The computer-accessible media of claim 50, wherein the implicit performance data includes data that represents at least one of whether the user clicked on the result, a location of the result when the user clicked the result, and a length of time that the user browsed the result.

52. The computer-accessible media of claim 50, wherein the implicit performance data further identifies an operation that the user performed on the result, including at least one of editing, e-mailing, printing, bookmarking, and copying.

53. The computer-accessible media of claim 50, wherein the implicit performance data includes captured data that has been aggregated across multiple interactions with the search result.

54. The computer-accessible media of claim 50, wherein the implicit performance data includes captured data that has been aggregated across multiple users interacting with the search result.

55. The computer-accessible media of claim 46, wherein the explicit performance data includes data obtained from the user's response to a search engine operator-generated inquiry about the search result, wherein the inquiry includes one of an on-line inquiry and a telephone inquiry.

56. The computer-accessible media of claim 46, wherein the human-judged performance data includes data obtained from a human evaluation of the search result.

57. The computer-accessible media of claim 46, wherein the relevance verification data includes data obtained from a verification test of the search result's relevance to verify whether a search result having a known relevance is still included in the search result generated by the search engine.

58. The computer-accessible media of claim 46, wherein the sample test data includes data obtained from a test of the search result's relevance performed on a sample of a subset of users.

59. The computer-accessible media of claim 45, wherein diagnosing at least one possible cause for an underperforming search result includes generating an instruction to make the following determinations:

determine at least one of whether the search result is no longer valid;

determine whether the search result appears in a poor location;

determine whether the search term that generated the search result is easily misspelled;and determine whether a search for the search term should be constrained to a specific resource.

60. The computer-accessible media of claim 45, wherein the instruction to adjust the operation of the search engine that produced the search result in accordance with the diagnosis, includes an instruction to modify the search engine's search schema to change the search result generated for the search term, wherein to change the search result includes at least one of to rerank, remove, and replace the search result.

61. The computer-accessible media of claim 45, wherein the instruction to adjust the operation of the search engine that produced the search result in accordance with the diagnosis, includes an instruction to modify the search engine's search schema to augment a presentation of the search result generated for the search term, wherein to augment the presentation includes at least one of to highlight, animate, enlarge, and reposition a display of the search result on a search result Web page.

62. The computer-accessible media of claim 45, wherein the instruction to adjust the operation of the search engine that produced the search result in accordance with the diagnosis, includes an instruction to increase the search engine's spellchecker tolerance.

63. The computer-accessible media of claim 45, wherein the instruction to adjust the operation of the search engine that produced the search result in accordance with the diagnosis, includes an instruction to prompt the user to one of clarify or nanow the search term with an additional user input.

64. The computer-accessible media of claim 45, wherein the instruction to adjust the operation of the search engine that produced the search result in accordance with the diagnosis, includes an instruction to temporarily adjust the operation of the search engine, and an instruction to further determine whether the adjustments have actually improved the search result performance before performing an instruction to permanently adjust the operation of the search engine.

65. The computer-accessible media of claim 45, wherein the instruction to adjust the operation of the search engine that produced the search result in accordance with the diagnosis, includes an instruction to adjust the operation of the search engine in real time.

66. The computer-accessible media of claim 65, wherein the instruction to adjust the operation of the search engine in real time includes an instruction to intercept the search result generated by the search engine and a further instruction to modify the search result before the search engine displays the search result to the user.

* * * * *

UNITED STATES PATENT AND TRADEMARK OFFICE
CERTIFICATE OF CORRECTION

| | |
|---|---|
| PATENT NO. | : 7,444,327 B2 |
| APPLICATION NO. | : 10/805731 |
| DATED | : October 28, 2008 |
| INVENTOR(S) | : Eric B. Watson et al. |

It is certified that error appears in the above-identified patent and that said Letters Patent is hereby corrected as shown below:

In column 6, line 6, delete "users" and insert -- users' --, therefor.

In column 11, line 2, delete "perfonnance" and insert -- performance --, therefor.

In column 11, line 3, delete "norniializing" and insert -- normalizing --, therefor.

In column 11, line 47, after "5B" insert -- , --.

In column 13, line 58, in Claim 11, after "search results" insert -- , --.

In column 14, line 17, in Claim 16, after "diagnosis" delete ",".

In column 14, line 23, in Claim 17, after "diagnosis" delete ",".

In column 14, line 31, in Claim 18, after "diagnosis" delete ",".

In column 14, line 35, in Claim 19, after "diagnosis" delete ",".

In column 14, line 40, in Claim 20, after "diagnosis" delete ",".

In column 14, line 47, in Claim 21, after "diagnosis" delete ",".

In column 19, line 14, in Claim 59, delete "misspelled;and" and insert -- misspelled; and --, therefor.

In column 20, line 10, in Claim 63, delete "nanow" and insert -- narrow --, therefor.

Signed and Sealed this
Twenty-sixth Day of April, 2011

David J. Kappos
*Director of the United States Patent and Trademark Office*